No. 720,943. PATENTED FEB. 17, 1903.
J. A. MANOR.
FRUIT GATHERER.
APPLICATION FILED NOV. 29, 1902.
NO MODEL.
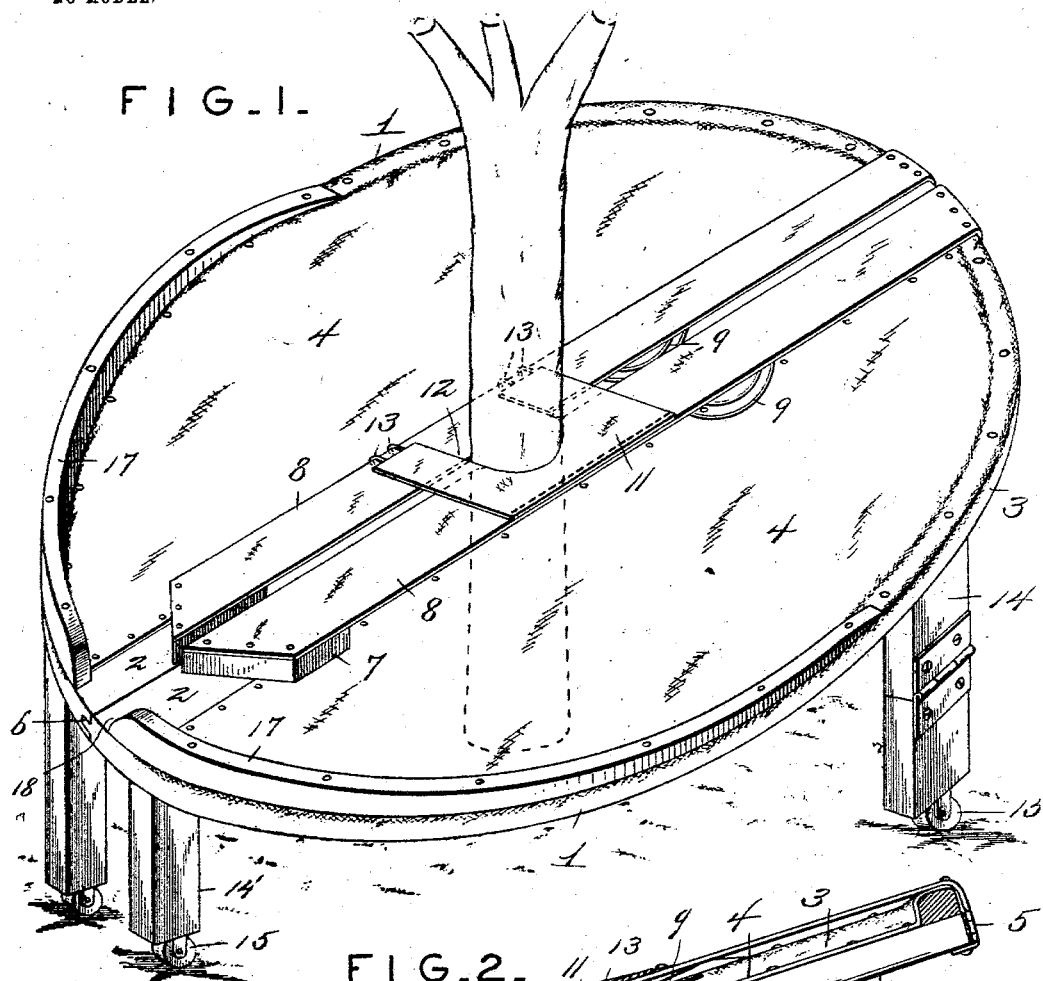
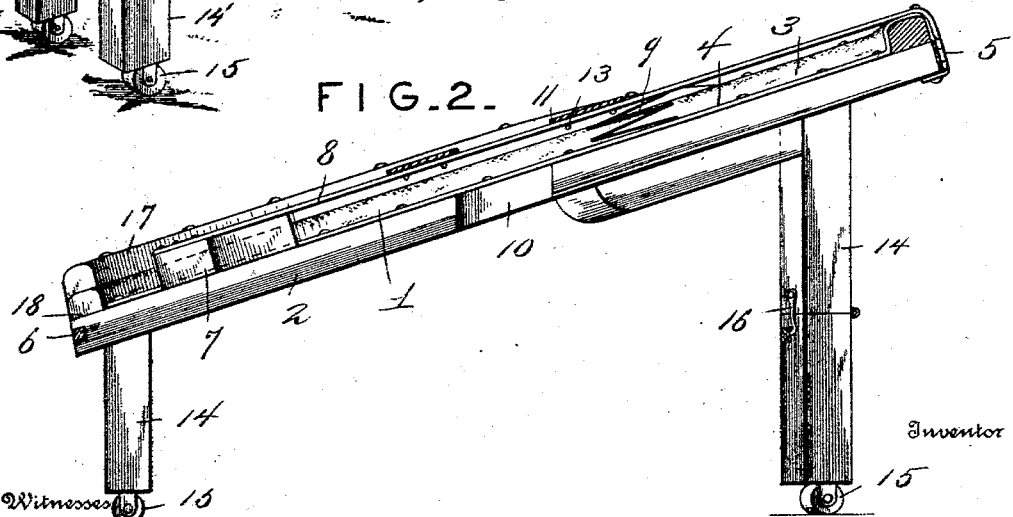
Witnesses: Inventor
Harry L. Amer. Joseph A. Manor.
Hubert D. Lawson. By Victor J. Evans Attorney

UNITED STATES PATENT OFFICE.

JOSEPH A. MANOR, OF FRISTOE, MISSOURI.

FRUIT-GATHERER.

SPECIFICATION forming part of Letters Patent No. 720,943, dated February 17, 1903.

Application filed November 29, 1902. Serial No. 133,231. (No model.)

*To all whom it may concern:*

Be it known that I, JOSEPH A. MANOR, a citizen of the United States, residing at Fristoe, in the county of Benton and State of Missouri, have invented new and useful Improvements in Fruit-Gatherers, of which the following is a specification.

My invention relates to new and useful improvements in fruit-gatherers; and its object is to provide a portable device of this character which may be readily moved from tree to tree and placed in position therearound.

Another object is to so construct a gatherer as to protect the fruit from injury when dropped thereupon and to discharge the same automatically at one point, and thereby pile it together upon the ground or in a receptacle so placed as to receive it.

With the above and other objects in view the invention consists in the novel construction and arrangement of the several parts, which will be more fully hereinafter described and claimed.

In the drawings, Figure 1 is a perspective view showing the fruit-gatherer in position about a tree, and Fig. 2 is a central vertical section through the device.

Referring to the figures by numerals of reference, 1 1 are substantially semicircular frames, each comprising a straight beam 2, connected at the ends by a bow-shaped strip 3, and both of said strips are covered by a semicircular strip of canvas or similar material 4, which is tacked or otherwise fastened thereto. The beams 2 are hinged together at one end, as shown at 5, and the opposite ends thereof are adapted to interlock, as at 6. Blocks 7 are arranged near these interlocking ends of the beams 2, and the ends of strips 8, of canvas or similar material, are secured thereto and extend over and longitudinally of the beams 2, the remaining ends of said strips being secured to the beams at points adjacent to the hinge 5. Springs 9 may, if desired, be interposed between the strips 8 and beams 2 in order to assist said strips in breaking the fall of the fruit dropping thereupon. The beams 2 are cut away adjacent to the center to form recesses 10, which are adapted to receive the trunk of a tree. A canvas flap 11 is secured to one of the strips 8 at a point directly above these recesses and is formed with a U-shaped recess 12 in vertical alinement with recesses 10. The free ends of this flap are provided with hooks 13, adapted to engage the outer edge of the adjacent strip 8, and thereby hold the flap flat upon the strips and close the gaps formed between the strips 8 at opposite sides of the trunk of the tree.

The frame 1 of this fruit-gatherer is mounted upon standards 14, having rollers 15, whereby the same may be readily moved from place to place. Those standards 14 which are located adjacent to the hinged end of the frame are preferably longer than the front standards and may, if desired, be formed into two sections hinged together and normally locked in extended position by means of a hook 16 or other suitable device. It will thus be seen that the frame is normally held in an inclined position. The lower edge of the frame is provided with rims 17, which serve to prevent the fruit deposited upon the canvas 4 from rolling over the edge of the gatherer. These rims extend to points adjacent to the interlocking edges of the beams 2, and the space 18, formed therebetween, serves as an outlet through which the fruit collected upon the canvas is permitted to pass.

In operation the device is rolled to the tree from which fruit is to be gathered and is swung open upon its hinge 5. The two frames of the device are then moved to opposite sides of the trunk of the tree until the recesses 10 are brought opposite thereto. Said frames may then be moved together and the flap 11 placed about the trunk and locked in position by means of the hooks 13. When the tree is shaken, the fruit will fall upon the gatherer and will be guided by the rims 17 down the inclined face thereof to the outlet 18, where it is discharged upon the ground or into a suitable receptacle provided therefor. It will be understood that the strips 8 serve to prevent the fruit from falling upon the hard surfaces of the beams 2, and the U-shaped flap 11 prevents the fruit from falling through the gaps formed between the strips 8 at opposite sides of the trunk.

In the foregoing description I have shown the preferred form of my invention; but I do not limit myself thereto, as I am aware that modifications may be made therein without departing from the spirit or sacrificing the advantages thereof, and I therefore reserve the right to make such changes as fall within the scope of my invention.

Having thus described the invention, what is claimed as new is—

1. In a fruit-gatherer, the combination with similar inclined frames having flexible coverings; of guiding-rims secured to the lower edges of said frames and forming an outlet therebetween.

2. In a fruit-gatherer, the combination with similar inclined frames hinged together and having flexible coverings, of a guiding-strip secured at the lower edge of each of the frames, said strips forming an outlet therebetween, and flexible means for forming a tight joint for fitting snugly about a trunk of a tree.

3. In a fruit-gatherer, the combination with similar inclined frames having flexible coverings, of means for securing said frames together, guide-strips at the lower edges of the frames and forming an outlet therebetween, and means secured upon a frame for inclosing a trunk of a tree and fitting snugly therearound.

4. In a fruit-gatherer, the combination with inclined frames having flexible coverings, of guide-strips secured to the lower edges of said frames and forming an outlet therebetween, flexible strips arranged above the adjoining edges of the frames, and means for connecting said strips and for fitting snugly about the trunk of a tree.

5. In a fruit-gatherer, the combination with inclined frames having flexible coverings, of guide-strips secured to the lower edges of said frames and forming an outlet therebetween, parallel flexible strips arranged above the adjoining edges of the frames, and a flap adapted to connect said strips and to fit snugly around the trunk of a tree.

6. In a fruit-gatherer, the combination with inclined frames having standards, of a flexible covering for each of said frames, a guide-strip at the lower edge of each frame, said strips forming an outlet therebetween, parallel flexible strips arranged above the adjoining edges of the frames, springs interposed between said edges, and the strips, and a flap for connecting said strips and adapted to fit snugly around the trunk of a tree.

In testimony whereof I affix my signature in presence of two witnesses.

JOSEPH A. MANOR.

Witnesses:
H. L. McDADE,
J. W. BEYLEY.